United States Patent
Sarkar et al.

(10) Patent No.: US 8,791,222 B2
(45) Date of Patent: Jul. 29, 2014

(54) POLYMERIC DYE FOR OPTICAL POWER LIMITING

(75) Inventors: Abhijit Sarkar, Midland, MI (US); Petar R. Dvornic, Midland, MI (US); James P. Godschalx, Midland, MI (US)

(73) Assignee: Oxazogen, Inc., Midland, MI (US)

( * ) Notice: Subject to any disclaimer, the term of this patent is extended or adjusted under 35 U.S.C. 154(b) by 74 days.

(21) Appl. No.: 13/496,680

(22) PCT Filed: Sep. 22, 2010

(86) PCT No.: PCT/US2010/002586
§ 371 (c)(1),
(2), (4) Date: Mar. 16, 2012

(87) PCT Pub. No.: WO2011/037619
PCT Pub. Date: Mar. 31, 2011

(65) Prior Publication Data
US 2012/0194932 A1    Aug. 2, 2012

Related U.S. Application Data

(60) Provisional application No. 61/277,308, filed on Sep. 23, 2009, provisional application No. 61/210,066, filed on Mar. 13, 2009, provisional application No. 61/069,439, filed on Mar. 14, 2008.

(51) Int. Cl.
| | | |
|---|---|---|
| *C08G 77/60* | (2006.01) | |
| *G02B 5/23* | (2006.01) | |
| *G02B 5/22* | (2006.01) | |
| *B82Y 20/00* | (2011.01) | |
| *C09B 47/067* | (2006.01) | |
| *C09B 69/10* | (2006.01) | |

(52) U.S. Cl.
CPC ............ *G02B 5/223* (2013.01); *B82Y 20/00* (2013.01); *C09B 47/0675* (2013.01); *C09B 69/108* (2013.01); *Y10S 977/742* (2013.01); *Y10S 977/75* (2013.01); *Y10S 977/752* (2013.01); *Y10S 977/753* (2013.01)
USPC ............... 528/35; 528/43; 528/38; 524/496; 252/582; 977/742; 977/750; 977/752; 977/753

(58) Field of Classification Search
USPC ......... 528/43, 38, 35; 524/496; 977/742, 750, 977/752, 753; 252/582
See application file for complete search history.

(56) References Cited

U.S. PATENT DOCUMENTS

| | | | |
|---|---|---|---|
| 4,131,609 A * | 12/1978 | Wynne et al. ................. | 540/128 |
| 5,741,442 A | 4/1998 | McBranch et al. | |
| 6,534,600 B2 | 3/2003 | Dvornic et al. | |
| 6,646,089 B2 | 11/2003 | Dvornic et al. | |
| 6,933,402 B2 | 8/2005 | Snow et al. | |
| 7,125,578 B1 | 10/2006 | McBranch | |
| 2002/0185634 A1 | 12/2002 | Marder et al. | |
| 2004/0241077 A1 | 12/2004 | Ryzhkov | |
| 2005/0090015 A1 | 4/2005 | Hartmann-Thompson | |
| 2007/0231566 A1 | 10/2007 | Yoneyama et al. | |
| 2008/0241262 A1 | 10/2008 | Lee et al. | |
| 2009/0083911 A1 * | 4/2009 | Holmes ........................... | 8/506 |
| 2011/0012074 A1 * | 1/2011 | Sarkar et al. ................. | 252/586 |
| 2011/0189462 A1 * | 8/2011 | Shihui et al. ................ | 428/304.4 |
| 2012/0175571 A1 * | 7/2012 | Sarkar ........................... | 252/582 |

OTHER PUBLICATIONS

Albota, M. et al., Science 281, 1653-1656 (1998).
Chen, P. et al., Phys. Rev. Lett. 82, 2548-2551 (1999).
Crane, R. et al. Materials for Optical Limiting-Proceedings of the Materials Research Society Symp., MRS, Pittsburgh, 374, pp. 341-347 (1995).
Drobizhev, M. et al., Opt. Lett. 26, 1081-1083 (2001).
Dvornic, P.R. et al., Polym. Prepr. 45(1), 585-586 (2004).
He, G.S. et al., Appl. Phys. Lett. 67, 2433-2435 (1995).
Hernanadez, F.E. et al., Opt. Lett. 25, 1180-1182 (2000).
Lawson, C.M. (Ed.), Nonlinear Optical Liquids and Power Limiters—Proceedings of the SPIE, SPIE, Bellingham, WA, 3146, pp. 54-60 (1997).
Miles, P.A., Appl. Opt. 33, 6965-6979 (1994).
Perry, J.W. et al., Opt. Lett. 19, 625-627 (1994).
Sprangler, C.W. et al., Proc. MRS Symp. 479, 59-67 (1997).
Van Stryland, E.W. et al., Nonlinear Opt. 27, 181-192 (2001).
Van Strylans, E.W. et al., Nonlinear Optics of Organic Molecules and Polymers, (Eds.) Nalwa, H.S.; Miyata, S., CRC Press, NY, pp. 841-860 (1997).
Webster, S. et al., Adv. Mater. 17, 1239-1243 (2005).
Xia, T. et al., Appl. Opt. 36, 4110-4122 (1997).
Zhou, G. et al., Appl. Opt. 41, 1120-1123 (2002).

* cited by examiner

*Primary Examiner* — Margaret Moore
(74) *Attorney, Agent, or Firm* — Technology Law PLLC; Karen L. Kimble (57) ABSTRACT

This invention concerns a polymer coating composition for use as non-focal optical power limiting dye containing polymeric materials. This composition contains: (1) one or more Modified Polymers comprising a Polymer, such as a hyperbranched polymer family, especially HB-PCS, HB-PU, HB-PUSOX or PC with one or more of: a) reverse saturable dye (RSA), b) multi-photon absorption dye (MPA), c) an azo dye, or d) absorption dye, which dye is chemically bonded to the pendant groups of the Polymer (along its chain and/or termini) or which forms a part of the backbone of the Polymer; (2) carbon nanotubes (CNT) as optical power limiters (OPL); and (3) a self-focusing component.

20 Claims, 2 Drawing Sheets

POLYMERIC DYE FOR OPTICAL POWER LIMITING

RELATED APPLICATIONS

The present application is related to U.S. Ser. No. 61/069,439, filed Mar. 14, 2008 and U.S. Ser. No. 61/210,066, filed Mar. 13, 2009 and claims benefit of priority from U.S. Ser. No. 61/277,308, filed Sep. 23, 2009 and International Application PCT/US2010/002586, filed Sep. 22, 2010, from which this application is the national phase application.

BACKGROUND OF THE INVENTION

1. Field of the Invention

This invention generally concerns protection from laser radiation for optical equipment and human eyes and anything else requiring such protection.

2. Description of Related Art

Laser light is a high intensity monochromatic radiation having extremely high coherence. An increasingly large number of applications based on lasers are currently available. Most applications in the consumer sector incorporate low intensity lasers such as compact discs, DVDs and other optical devices, while high intensity lasers largely remain in the research, medical, defense, industrial, nuclear and astronomy sectors. Low energy lasers are commonly used in law enforcement and warfare for target illumination.

Development of both low and high power laser systems has reached the maturity where such systems are economically and technically feasible. The main requirement for protection against laser damage of optical receptors, especially in the case of high sensitivity devices, is high transparency under low intensity and ambient conditions combined with opacity under high intensity radiation.

Laser eye protection (LEP) incorporates cutting edge technologies (reflective coatings and advanced absorbing dyes) to protect against lasers at wavelengths in the near-infrared (NIR) and visible portions of the electromagnetic spectrum. However, these technologies produce filters that always block the light for which they are designed, whether under laser illumination or not. When these filters block visible light they have a negative impact on visibility for the person using such eyewear, including even some filters intended only for NIR protection. These negative effects increase proportionally with the number of visible wavelengths blocked until the filter becomes opaque. Active filters, i.e., those blocking light only when illuminated with a laser, are a conceptual solution to this problem; however, they currently do not respond fast enough to protect against pulsed laser systems in nanosecond time domains. Pulsed emissions can be created at numerous wavelengths, and the high peak power in very short pulses can cause retinal injury at average energy outputs that would not be injurious for a continuous wave emitter.

Optical power limiters (OPLs) are materials and devices designed to allow normal transmission of light at low intensities and limited transmission of light at higher intensities. They function so as to form an optical barrier as a direct response to excessive intensity of light, thus providing a promising technology currently under development for protecting against pulsed lasers. OPLs are nonlinear optical materials and devices designed to allow normal transmission of light at low intensities and limited transmission of light at higher intensities [e.g., Spangler, C. W. et al., *Proc. MRS Symp.*, 479, 59 (1997)].

There are various important considerations that go into the design of an OPL device. The threat of very short intense laser light pulses requires a device with extremely rapid response to changing light intensity. Fast response times favor materials-based devices over mechanical ones. The material must be able to withstand the impact of prolonged exposure to high intensity light, as well as to allow for continuous transparency in regions outside the path of the high intensity light.

The problem with current OPL technology for LEP is that the threshold energy for nonlinear behavior, i.e. OPL activation energy threshold is much higher than the threshold for retinal injury. Because of this fact, current OPL materials require a lens system to collect and focus the incident energy on the OPL in order to create a nonlinear behavior at incident energies relevant to retinal protection. This requirement translates into heavy and bulky LEP devices. An OPL that doesn't require a focal plane would result in LEP that is significantly smaller and lighter than current LEP devices allow. Advantages of such devices for personal protection are obvious. Consequently, for over a decade, several research groups have been attempting to develop novel OPL materials based on nonlinear optical (NLO) dyes. [See, for example, Spangler, C. W. et al., *Proc. MRS Symp.*, 479, 59-67 (1997); Albota, M. et al., *Science* 281, 1653-1656 (1998); Hernandez, F. E. et al., *Opt. Lett.* 25, 1180-1182 (2000); Drobizhev, M. et al., *Opt. Lett.* 26, 1081-1083 (2001); He, G. S. et al., *Appl. Phys. Lett.* 67, 2433-2435 (1995); and Perry, J. W. et al., *Opt. Lett.* 19, 625-627 (1994).]

In order to be useful for practical applications, however, an OPL material must fulfill all of the following requirements:
1. It must have a fast response time.
2. It should operate over a broad wavelength range.
3. The on-off cycle must be extremely fast, ideally following the cycle frequency of the laser pulse it is responding to.
4. It must have a low threshold activation energy for OPL onset.

OPL devices rely on one or more nonlinear optical mechanisms, which include: (1) Reverse Saturable Absorption (RSA); (2) Two-Photon Absorption (TPA); (3) Multi-Photon Absorption (MPA); (4) nonlinear refraction; (5) induced scattering; and (6) photorefraction. A number of these processes have been extensively studied for OPL applications. [See, for example, Van Stryland, E. W. et al., *Nonlinear Optics of Organic Molecules and Polymers*, (Eds.) Nalwa, H. S.; Miyata, S., CRC Press, New York, pp 841-860 (1997); Crane, R.; Lewis, K.; Van Stryland, E. W.; Khoshnevisan, M. (Eds.), *Materials for Optical Limiting-Proceedings of the Materials Research Society Symp.*, MRS, Pittsburgh, 374, pp. 341-347 (1995); Lawson, C. M. (Ed.), *Nonlinear Optical Liquids and Power Limiters-Proceedings of the SPIE*, SPIE, Bellingham, Wash., 3146, pp 54-60 (1997); Xia, T. et al., *Appl. Opt.* 36, 4110-4122 (1997); and Zhou, G. et al., *Appl. Opt.* 41, 1120-1123 (2002).] To date, however, there is no one OPL material available which, taken individually, can provide ideal and smooth attenuation of an output beam. Therefore, the design and development of radically novel types of materials for OPL are urgently required.

In this regard, some attempts were made with combinations of NLO materials in cascading geometries, such as multi-plate or tandem cells [see Miles, P. A. *Appl. Opt.* 33, 6965-6979 (1994)] and the use of two intermediate focal planes in a sighting system [see Van Stryland, E. W. el al., *Nonlinear Opt.* 27, 181-192 (2001)].

The human eye is a very sensitive optical sensor with a very low damage threshold for the retina (~0.5 µJ into the pupil of the eye or 40 µJ/cm²). This imposes stringent demands on materials for laser protection. Existing nonlinear optical materials can respond to such low energies only when the light is tightly focused—this is achieved most easily in an optical system which provides focal planes at which the nonlinear material can be positioned.

Clearly, it would be desirable to have such materials available.

BRIEF SUMMARY OF THE INVENTION

The present invention provides an absorption dye containing polymer coating where other desired components are added. Specifically, the present invention provides a dye containing polymer coating composition comprising:
1) one or more Modified Polymers comprising a Polymer with one or more of: a) reverse saturable dye (RSA), b) multi-photon absorption dye (MPA), c) an azo dye, or d) an absorption dye, which dye is chemically bonded to the pendant groups of the Polymer (along its chain and/or termini) or which forms a part of the backbone of the Polymer; and
2) carbon nanotubes (CNT) as optical power limiters (OPL); and
3) a self focusing component.

Additionally the Modified Polymer itself is another aspect of this invention. The Modified Polymer where the dye is present in the backbone of the Polymer is especially preferred.

The composition contains the above components and is usually a liquid and the coating that is formed from the composition may be either a liquid or solid. The polymer may be one or more Polymers, especially hyperbranched polymers as described in more detail later, chemically modified by the dye.

The Modified Polymer uses complementary NLO materials, namely sMWNT, that have been blended together with the Modified Polymer matrix to achieve the desired results for protection from pulsing laser energy. Thus the sMWNT can be dispersed in the Modified Polymer or in the Polymer or both. If the sMWNT is dispersed in the Polymer, then the Modified Polymer and the Polymer are blended together with other components.

The CNT transfers the absorbed laser energy to the dyes in the Modified Polymer. The protection from laser energy has been further fortified by the use of self-focusing components in the form of a film coating.

Numerous uses for such laser protection of eyes and equipment are apparent.

DETAILED DESCRIPTION OF THE INVENTION

Glossary

The following terms as used in this application are to be defined as stated below and for these terms, the singular includes the plural.
CNT means carbon nanotubes
DR1 means disperse red 1
DMNPAA means 2,5-dimethyl-(4-p-nitrophenylazo)anisole
DWNT means double-wall carbon nanotubes
FTIR means Fourier Transform Infrared Spectroscopy
h means hours
HB or HBP means hyperbranched polymer
HB-PCS means hyperbranched polycarbosiloxane polymer
HB-PCS/CNT means hyperbranched polycarbosiloxane matrix with carbon nanotubes
HB-PU means hyperbranched polyurea
HB-PUSOX means siliconized hyperbranched polyurea siloxane
LEP means laser eye protection
min means minutes
MPA means multi-photon absorber or multi-photon absorption
Modified Polymer means any Polymer where one or more dye moieties have been chemically bonded to the pendant groups of the Polymer, along its length or its termini, and/or form a part of the Polymer backbone
MWNT means multiwall carbon nanotube-(s); used from a commercial supplier such as Cheap Tubes, Inc.; purity ≥95%, number of walls=≥3, outer diameter=8-50 nm, inside diameter=2.5-10 nm, length=2.5-20 μm; optional functionalization with hydroxyl or carboxylic groups=~2-4%
sMWNT means short multiwall carbon nanotube(s); used from a commercial supplier such as Cheap Tubes, Inc.; purity ≥95%, number of walls=≥3, outer diameter=8-50 nm, inside diameter=2.5-10 nm, length=0.1-2 μm; optional functionalization with hydroxyl or carboxylic groups=~2-4%
NIR means near-infrared
NLO means nonlinear optics or nonlinear optical
OPL means optical power limiting or optical power limiters
Pc means phthalocyanine
PC means polycarbonate
PCS means polycarbosiloxane
Polymer means linear, branched, grafted, dendritic or hyperbranched polymers, such as HB or HBP, HB-PCS, HB-PU, HB-PUSOX, PCS and PU
Polymer matrix means linear, branched, grafted, dendritic or hyperbranched polymers that contain two or more crosslinkable groups, including but not limited to polyamides, polyureas, polyurethanes, polysiloxanes, polycarbosiloxanes, polycarboxysilanes, polycarbosilanes, and polymers containing amino, carboxylic acid, cyano, isocyanate, hydroxyl and similarly reactive groups.
PU means polyurea
RI means refractive index
RSA means reverse saturable absorption
RT means room temperature, about 20-25° C.
SWNT means single wall carbon nanotubes; used from a commercial supplier such as Cheap Tubes, Inc.; purity ≥90%, outer diameter=1-2 nm, inside diameter=0.8-1.6 nm, length=5-30 μm; optional functionalization with hydroxyl or carboxylic groups=~2-4%
sSWNT means short single wall carbon nanotubes; used from a commercial supplier such as Cheap Tubes, Inc.; purity ≥90%, outer diameter=1-2 nm, inside diameter=0.8-1.6 nm, length=0.5-2 μm; optional functionalization with hydroxyl or carboxylic groups=~2-4%
TPA means two-photon absorber or two-photon absorption Discussion The present invention provides novel laser blocking materials in the 400-1400 nm wavelength region with: (1) a fast response time, (2) high transparency at normal illumination conditions, (3) an increased broadband spectral response for the protection of eyes and sensors against Q-switched lasers, and (4) optical power limiting (OPL) activation without a focal plane.

Such non-focal optical power limiting materials would have a number of potential military and civilian applications such as: (1) Protective equipment for military personnel in combat situations to help protect soldier's eyes, especially in eye protection equipment; (2) Protective devices for civilian law enforcement personnel where low energy laser beams are used for detection systems; (3) Protection systems for the health sector where doctors, support staff and patients can protect their eyes from harmful rays originating from laser based equipment, such as in laser based surgery; (4) Protection of optical receivers and transmitters on laser based satellite communication systems; and (5) Protection of optical components used in commercial communication satellites.

Specifically, this invention provides a dye containing polymer coating composition comprising:

1) one or more Modified Polymers comprising a Polymer with one or more of: a) reverse saturable dye (RSA), b) multi-photon absorption dye (MPA), c) an azo dye, or d) absorption dye, which dye is chemically bonded to the pendant groups of the Polymer (along its chain and/or termini) or which forms a part of the backbone of the Polymer; and
2) carbon nanotubes (CNT) as optical power limiters (OPL); and
3) a self focusing component.

This covalent attachment to the Polymer via the functionalized dye offers the potential advantages of more uniform dispersion of the dye in the matrix and the potential to achieve higher loading levels of the dye in the matrix relative to a dispersion process. The covalent attachment can occur in a number of manners including pendant at the ends of the hyperbranched polymer chains, pendant along the length of the hyperbranched polymer chains, or incorporated into the length (backbone) of the hyperbranched polymer chains. These variations are accomplished by varying the functionality on the dye. That is a monofunctional dyes will lead to pendant dyes; while polyfunctional dyes will lead to the dye being incorporated into the length (i.e., as part of the backbone) of the polymer chains. The Modified Polymer where the dye is present in the backbone of the Polymer is especially preferred.

The timing of addition of the functionalized dye during synthesis of the hyperbranched polymer (e.g., having the functionalized dye present at the beginning of the synthesis with the other monomers) leads to incorporation of the dyes into the polymer chains; while adding the functionalized dye after the initial hyperbranched polymer is formed will lead to incorporation of the dyes at the chain ends. The type of functionality will depend on the chemistry of the specific matrix precursors. For example, for HB-PCS materials prepared by hydrosilation, vinyl groups would be desirable; for HB-PU systems, amine, hydroxyl, or isocyanate functionality would be desirable; for polycarbonate systems, phenolic functionality would be desirable. The degree of functionality could practically range from 1 to about 6.

To achieve these desirable results complementary NLO materials, namely sMWNT, have been blended together with the Polymer matrix. A dual approach has been adopted, i.e., (a) low threshold energy for cis-trans transformation of azo dyes bonded to the Polymer, and (b) sMWNT's ability to absorb energy from the laser irradiation and transfer it to the RSA dyes. Additionally, to trigger the OPL mechanisms of the system at lower threshold activation energy, thin films made of metal nanoparticles or metal oxide nanoparticles and organic chromophores in a polymer matrix have been introduced. These nanoparticles and chromophores cause self-focusing of the input laser beam thereby satisfying the OPL threshold activation energy. Metal nanoparticles such as Cu, Ag and Au nanoparticles, metal oxide nanoparticles such as $TiO_2$ nanoparticles and organic third order nonlinear optical materials are among the self-focusing components that are used. Two different coating configurations were prepared and evaluated: (1) single-layer filter, and (2) multi-layer filter.

Carbon Nanotubes (CNTs) and RSA dyes show excellent OPL properties but their use is limited in a device application unless these OPL materials are mixed with a host matrix, such as a polymer, in order to be fabricated into useful shapes providing exceptional value and versatility.

The present invention provides a novel and unique method to incorporate CNTs along with other OPL-active components in a proprietary Modified Polymer matrix, such as hyperbranched polymers, as well as other polymers, such as other dendritic polymers, polycarbonates, epoxy resins, polymethylmethacrylates, etc. Besides single-wall carbon nanotubes (SWNTs), double-wall carbon nanotubes (DWNTs) and multi-wall carbon nanotubes (MWNTs), other components being used are self-focusing chromophores that, in combination, attenuate laser irradiation over the visible and NIR wavelength region.

Siloxane-based polymers can be processed into thin films and coatings that are mechanically robust and optically clear. Siloxane based polymers can also be formed into three dimensional networks via a sol-gel process resulting in a homogeneous material. [See Dvornic, P. R.; Hu, J.; Meier, D. J.; Nowak, R. M., U.S. Pat. Nos. 6,534,600 and 6,646,089; and Dvornic, P. R.; Hu, J.; Meier, D. J.; Nowak, R. M. *Polym. Prepr.*, 45(1), 585-586 (2004).]

Hyperbranched (HB) polycarbosiloxane (PCS)—CNT hybrid networks can also be synthesized by sol-gel processing and lead to stable and durable materials. The novelty of using a dye chemically bonded to the HB-polycarbosiloxane matrix leads to the reduction of CNT aggregation. The homogeneous and transparent character of the HB-PCS/CNT composite films makes them appropriate for use as an OPL material. PCS-based films have the added advantage of superior flexibility as a function of temperature. A series of other RSA dyes, MPA dyes and azo dyes can also be used, in combination, as part of the Modified Polymer to fine tune the laser blocking material.

Polycarbonate (PC) can be used as the host polymer for the OPL-active dopants. For this, melt-blending of the PC and OPL components is followed by molding into appropriate shapes for OPL evaluation. The doped PC substrate can also be coated with HBP based OPL material to optimize OPL effects. This results in an OPL device that is mechanically robust, scratch resistant, and practical for field applications. The PC can also be synthesized from appropriately functionalized dyes to covalently attach the dye into the PC polymer chains or pendant from the PC polymer chains.

General synthetic strategies developed for this invention can be used to produce improved HBPs that satisfy the above requirements. These polymers contain an optimum concentration of siloxane groups, degree of branching and cross-linking, thus satisfying material parameters in terms of flexibility and stress resistance.

Proprietary HBP families, namely HB-PCS and HB-PU, which form excellent optical quality films and coatings have been used as the Polymer materials for this invention. The salient feature of this system is the use of the Modified Polymer in combination of three different OPL mechanisms in an additive way to provide efficient protection from laser beam damage along with the self-focusing mechanism. [See, for example, other component systems by Chen, P. et al., *Phys. Rev. Lett.*, 82, 2548-2551 (1999); and Webster, S. et al., *Adv. Mater.*, 17, 1239-1243 (2005).]

For a polymer composite coating to work as a laser blocking material, an appropriate choice and formulation of active components is necessary. Towards this end, a model system has been formulated using a Modified Polymer matrix (preferably HB-PCS, HB-PUSOX or PC) chemically bonded to RSA dye (preferably fullerene based donor-acceptor complex), MPA dye (preferably, stilbene-3), azo dye (preferably disperse red 1 (DR1) acrylate or 2,5-dimethyl-(4-p-nitrophenylazo)anisole, (DMNPAA), and CNT (preferably sMWNT).

Filters of two different configurations have been prepared. The single-layer filter is made up of the polymer matrix containing a combination of OPL-active components. For a multi-layer coating, a formulation consisting of self-focusing components in a polymer matrix has been designed. A thin layer of this formulation is coated on the base filter. A third thin film layer is coated that consists of CNT in a suitable Modified Polymer matrix (preferably, HB-PUSOX as the Polymer).

OPL has been observed in the past using carbon nanotubes in a suitable solvent, where it occurs due to solvent bubble formation which scatters light at high fluence. The carbon nanotubes absorb incident light and transfer energy to the solvent to form bubbles.

The present invention provides a similar system in a Modified Polymer host. This provides a much more useful laser blocking material suitable for incorporation into eye protection devices than presently used dye filters or a similar system.

The invention will be further clarified by a consideration of the following examples, which are intended to be purely exemplary of the present invention.

Example 1

Preparation of HB-PCS and its Modification

The hyperbranched polymer HB-PCS was prepared as shown in Scheme 1 below by methods described in U.S. Pat. Nos. 6,534,600 and 6,646,089 and *Polym. Prepr.* 45(1), 585 (2004).

A 100 mL 3-neck round-bottom flask equipped with a reflux condenser was charged with 1,3-divinyltetraethoxydisiloxane (7.999 g, 25.02 mmol) and tetrakis(dimethylsiloxy)silane (13.334 g, 40.56 mmol). It was flushed with $N_2$ and stirred for 5 mins Platinum-divinyltetramethyldisiloxane complex xylene solution (Karstedt catalyst, ~2% platinum in xylene) (0.0239 g) was added to the mixture. It was stirred at room temperature for 1 h and then heated in an oil bath at 50° C. for 22 h. The product was washed 5 times with 20 mL anhydrous acetonitrile. The volatiles were stripped off in a rotary evaporator at room temperature, and the colorless viscous oil product was dried under vacuum overnight. Yield: 15.21 g.

The polymer contains two types of functionalities. One functionality is the intramolecular $—Si(OEt)_n$ functionality and the other functionality is $—(SiMe_2H)_m$ end-groups. The product was characterized by FTIR where signals at: 2971 $cm^{-1}$ and 2877 $cm^{-1}$ correspond to C—H stretching frequency present in the methyl ($CH_3$) group, 2132 $cm^{-1}$ (Si—O—Si stretching), 1254 (Si—$CH_3$), and 1076 and 773 (Si—O).

Scheme 1

This polymer was used to prepare the alkoxysilyl derivative as described in Scheme 2 below. This polymer is one of two HBP components for the HBP network matrix of this invention.

Example 2

Preparation of Trialkoxysilyl-Functionalized HB-PCS

HB-PCS from Example 1 was also used to prepare the alkoxysilyl derivative by end-capping with vinyltrimethoxysilane [$CH_2$=$CHSi(OMe)_3$] as shown below in Scheme 2. This polymer is the other component of the HBP network matrix.

A 100 mL round-bottom flask equipped with a reflux condenser was charged with HB-PCS of Example 1 (3.09 15 g, SiH 13.06 mmol) and vinyltrimethoxysilane (3.7832 g, 25.50 mmol). It was flushed with $N_2$ and stirred for 5 min. Karstedt catalyst (~2% platinum in xylene) (0.0175 g) was added to the mixture. It was stirred at room temperature for 1 h, and then heated in an oil bath at 50° C. for 16 h. FTIR of the crude product showed that the —SiH end-groups peak at 2133 $cm^{-1}$ disappeared, indicating that the reaction was complete. The product was only slightly soluble in acetonitrile, so it was not washed. The volatiles were stripped off in a rotary evaporator at room temperature, and the colorless viscous oil was dried under vacuum overnight. Yield: 4.85 g. The product was characterized by FTIR where signals at: 2959 $cm^{-1}$ and 2878 $cm^{-1}$ correspond to C—H stretching frequency present in the methyl ($CH_3$) group, 2132 $cm^{-1}$ (Si—O—Si stretching), 1256 (Si—$CH_3$), and 1086 and 795 (Si—O) were found.

Scheme 2

Example 3

Synthesis of Modified HB-PCS [Varying the Ratio of Methyl (Me) and Ethoxy (OEt) Intramolecular Groups]

Synthesis of new HBPs that contained a lower relative concentration of intramolecular ethoxy functional groups was performed. The general synthesis is shown below in Scheme 3:

Scheme 3

The stoichiometries for different HB-PCS are shown in Table 1. For all compositions, the procedure used was identical to that described in Scheme 3. HB-PCS-SiH (98/2) means that this polymer contained a maximum of 98% methyl group (Me) and 2% ethoxy (OEt) and that it was obtained from the mixture of divinyl monomers of the corresponding composition.

TABLE 1

Mole stoichiometries of starting materials for different HB-PCS-SiH

| Molar ratio between (Me) & (OEt) | Modified HB-PCS-SiH | Tetrakis(dimethyl-siloxy)silane mmol | 1,3-Divinyltetramethyl disiloxane (Me); mmol | 1,3-Divinyltetraethoxy disiloxane (OEt); mmol |
|---|---|---|---|---|
| 98/2 | (98/2) | 60.84 | 39.75 | 0.8112 |
| 95/5 | (95/5) | 60.84 | 38.52 | 2.03 |
| 90/10 | (90/10) | 60.84 | 36.41 | 3.59 |

TABLE 1-continued

| | | | 1,3- | 1,3- |
| Molar ratio between (Me) & (OEt) | Modified HB-PCS-SiH | Tetrakis(dimethyl-siloxy)silane mmol | Divinyltetramethyl disiloxane (Me); mmol | Divinyltetraethoxy disiloxane (OEt); mmol |
| --- | --- | --- | --- | --- |
| 85/15 | (85/15) | 60.84 | 34.49 | 6.087 |
| 80/20 | (80/20) | 60.84 | 32.44 | 8.312 |

Example 4

Synthesis of HB-PU

The hyperbranched polyurea HB-PU was prepared as shown in Scheme 4 below by methods described in U.S. Pat. Nos. 6,534,600 and 6,646,089 and *Polym. Prepr.* 45(1), 585 (2004). The polymer contained terminal amine functionality in addition to the internal urea functionality.

Scheme 4

Hexamethylene diisocyanate, HMDI + Diethylene triamine, DETA

Hyperbranched polyurea, HB—PU

Amine titration of HB-PU determined 4.547 meq/g of primary amines in 50.38 g of solid material.

Example 5

Synthesis of HB-PUSOX

HB-PUSOX was synthesized from amine terminated HB-PU of Example 4 as shown in Scheme 5 below.

Scheme 5

The polymer contained terminal methoxysilyl functionality in addition to internal urea functionality.

Example 6

Preparation of an HB Polymer Modified with Functionalized Dye

A hyperbranched polymer can be synthesized by the reaction of a difunctional monomer AA and a trifunctional monomer BBB as shown below. The introduction of a functionalized dye monomer F-Dye-F leads to incorporation of the dye into the hyperbranched polymer structure.

Scheme 6

Excess

-continued

Example 7

Preparation of an HB Polymer Modified with Functionalized Dye

Another variation to form the desired Modified Polymer is to react: a) a functionalized dye, with b) the internal latent functionality that exists in a preformed hyperbranched polymer, such as those disclosed in "Hyperbranched Polymers with Latent Functionality and Methods of Making Same", U.S. Pat. No. 6,646,089 B2.

Example 8

Preparation of Tetra(2-allylphenoxy)leadphthalocyanine (2)

2

Procedure of Snow, A. W. et al. U.S. Pat. No. 6,933,402 B2, was followed.

Example 9

Preparation of 4-(2-allylphenoxy)phthalonitrile

To a 100-mL round-bottom flask was added 4-nitrophthalonitrile (5.00 g, 0.029 moles), 2-allylphenol (3.82 mL, 0.029 moles), and anhydrous dimethyl sulfoxide (25 mL). The mixture was stirred at RT under a nitrogen atmosphere. Potassium carbonate (6.37 g, 0.046 moles) was added in 0.32 and 0.50 g portions every 30 min. over a 6 h period after which the remaining material was added in one portion. The reaction mixture was stirred at RT for 24 h. The reaction mixture was filtered through a coarse fritted funnel and rinsed with 50 mL of methylene chloride. The filtrate was transferred to a separatory funnel, diluted with 50 mL methylene chloride, and washed with water (5×50 mL). The organic layer was dried ($MgSO_4$), filtered, and concentrated on a rotary evaporator to give a yellow-orange liquid (7.78 g). The oil was purified by column chromatography on silica gel using methylene chloride as the eluting solvent. A major component with an $R_f$ value of 0.5 (by thin layer chromatography) was collected and solvent removed on a rotary evaporator and a vacuum pump to give a light yellow oil (~7 grams). FT-IR analysis was consistent with the structure of the desired product with a strong band at 2232 $cm^{-1}$ corresponding to the nitrile group and bands associated with the starting materials (—OH, —$NO_2$) were gone.

Example 10

Preparation of Lead Phthalocyanine(2-allylphenoxy)$_4$ (PbPc(allyl)$_4$)

To a 12 mm×75 mm test tube was added 4-(2-allylphenoxy)phthalonitrile (0.5 g, 1.92 mmol) and lead(II) oxide (0.33 g, 1.47 mmol). The tube was capped with a silicone septum and degassed by connection to a vacuum pump through a syringe needle that pierced the septum. The mixture was heated in an oil bath to 70° C. under vacuum. The vacuum line was then replaced with a nitrogen inlet and the mixture was heated in stages to 180° C. The material went from yellow to light green, to dark green, to dark over the first couple hours of heating. The material was kept at 180° C. overnight. The tube was removed from the oil bath and allowed to cool to RT. The material in the tube appeared to be solid and was removed by dissolving in methylene chloride. The product was purified by column chromatography (1"× 14" column) on silica gel using methylene chloride as the eluting solvent. An initial band off the column with a blue-green color was discarded and an intense dark green band coming off the column next was collected and solvent removed on a rotary evaporator followed by a vacuum pump at RT to give a dark sold. The resultant material was analyzed by UV-Vis in methylene chloride and the spectrum is consistent with that for the desired product reported in the literature.

Example 11

Incorporation of PbPc(Allyl)$_4$ into HB-PCS Formulation

A. Neat Reaction Mixture

To a 100-mL three necked flask fitted with a nitrogen inlet, a condenser/septum/syringe needle, and a Teflon stopper was added divinyltetramethyldisiloxane (8.854 g, 0.0475 moles), divinyltetraethoxydisiloxane (0.77 g, 0.00251 moles), and tetrakis(dimethylsiloxy)silane (24.65 g, 0.075 moles). The mixture was stirred under a nitrogen purge and then PbPc (allyl)$_4$ (0.0857 g, 6.87E-5 moles) was added as a solid. The solid did not all dissolve. Karstedt's catalyst (42 μL) was added using a pipetor. After ~5 mins the reaction became exothermic and quite hot. The solution became green, but some solid remained. After 1 h the flask was immersed in an oil bath which was then heated to 50° C. overnight. The reaction mixture was cooled and transferred to a 200-mL beaker where it was washed with acetonitrile (4×40 mL). Some dark solid remained in the reaction flask. The material was then devolatilized in a 250-mL round bottom flask on a rotary evaporator at 30° C. followed by a Kugelrohr distillation apparatus at 80° C. The resultant material was fairly deep green. The material was then filtered through a 0.45 micron syringe filter. The filtrate was a pale green solution suggesting that there was a large amount of large particles suspended in the initial product prior to filtration, but that some material had reacted into the polymer. The general synthesis is shown below in Scheme 7.

B. Reaction in Toluene

To a 100-mL three necked flask fitted with a nitrogen inlet, a condenser/septum/syringe needle, and a Teflon stopper was added divinyltetramethyldisiloxane (4.43 g, 0.0238 moles), divinyltetraethoxydisiloxane (0.38 g, 0.00124 moles), and tetrakis(dimethylsiloxy)silane (12.33 g, 0.0375 moles). The mixture was stirred under a nitrogen purge and then PbPc (allyl)$_4$ (0.0442 g, 3.54E-5 moles) was added as a solution in toluene (20 mL). The reaction mixture was a clear homogeneous dark green solution. Karstedt's catalyst (21 µL) was added using a pipetor. There was no apparent large exothermic reaction. After 1 h the flask was immersed in an oil bath which was then heated to 50° C. overnight. The reaction mixture was cooled and transferred to a 250-mL round bottom flask and solvent removed on a rotary evaporator at 50° C. The resultant material was then washed with acetonitrile (4×30 mL). The material was then devolatilized on a rotary evaporator at 30° C. followed by a Kugelrohr distillation apparatus at 80° C. The resultant material was fairly deep green. The material was then filtered through a 0.45 micron syringe filter. The filtrate was a dark green clear solution suggesting that the dye has been successfully incorporated into the matrix.

Figure 1:
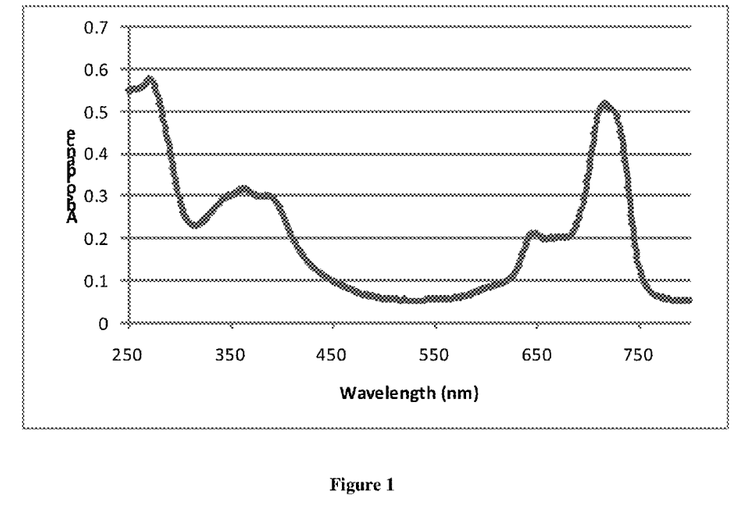
FIG. 1 shows the UV-Vis spectrum of a functionalized dye monomer, PbPc(allyl)$_4$, to be used in the polymerization reactions.
Figure 2:
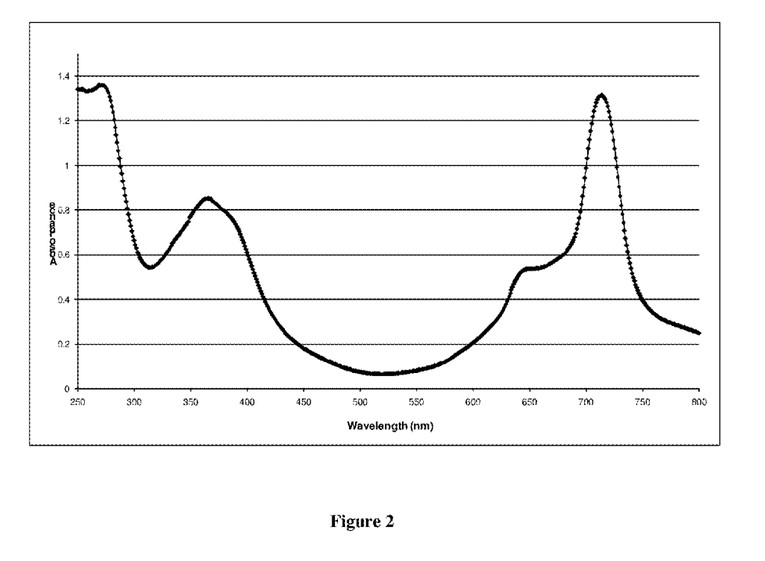
FIG. 2 shows the UV-Vis spectrum of the Modified Polymer prepared using HB-PCS having 95/5 ratio of Me/OEt based monomers as the Polymer and PbPc(allyl)$_4$ as the functionalized dye.

The UV-Vis spectrum of the dye dissolved in solvent is shown in FIG. 1 followed by the UV-Vis spectrum of the hyperbranched polymer/functionalized dye copolymer in FIG. 2. The spectra show that the absorbance characteristics of the dye are not significantly changed as a result of incorporating the functionalized dye into the polymer matrix.

immersed in an oil bath which was heated to 50° C. overnight. The reaction mixture was cooled then transferred to a single necked round bottom flask and solvent removed on a rotary evaporator. The residue was washed with acetonitrile (4×30 mL), devolatilized using a rotary evaporator at 30° C., followed by devolatization using a Kugelrohr distillation apparatus at 80° C. at full vacuum for 30 mins. The resultant material was a water-white clear liquid (12.85 g, ~75%). A sample was diluted in methylene chloride and analyzed by UV-Vis spectroscopy. Bands indicative of anthracene were present indicating that the 9-vinylanthracene was incorporated into the polymer.

Example 13

Preparation and Optimization of Polymer Blend Formulations

For the laser blocking coatings of this invention, the polymer matrix (HBPs or other polymers) is the carrier of all of the components responsible for optical power limiting. Therefore, it is important to perfect the polymer formulations in such a way that the network matrix' properties will be conducive to the various laser limiting and blocking mechanisms. The ideal polymer network matrix should have the following features:

(1) It should form a film/coating with excellent transparency throughout the visible-NIR broadband region (400 nm to 1400 nm).

Scheme 7

Example 12

Anthracene Modification

To a 100-mL three-necked round bottom flask fitted with a condenser/nitrogen inlet and two stoppers was added divinyltetramethyldisiloxane (4.43 g, 23.8 mmole), divinyltetraethoxydisiloxane (0.38 g, 1.24 mmoles), and tetrakis(dimethylsiloxy)silane (12.33 g, 37.5 mmoles). A solution of 9-vinylanthracene (0.0442 g, 0.525 mmole) in toluene (20 mL) was then added and the mixture stirred at RT. Karstedt's catalyst (21 microliters) was added using an automatic pipette. The mixture was stirred for 1 h then the flask was (2) It should form a coherent and strongly adhering film/coating on a variety of transparent substrates, including glass.

(3) In another configuration, the substrate polymer matrix, such as PC, incorporating the OPL components should be able to form a LEP filter all by itself.

(4) The optical power limiting (laser blocking) mechanisms in the system include light scattering by bubble formation in the sMWNT's localized environment. Two requirements for such a mechanism to work fast and efficiently include transfer of energy from the sMWNT to the polymer network matrix and the ability of the polymer matrix to soften enough to form microbubbles by the energy gain from laser impingement. Therefore, the network matrix should be optimally hard at the macroscale to withstand field environmental conditions while at the same time it should be adequately soft at the nanoscale due to the heat generated by the laser radiation.

Under normal use conditions, the HB-PCS-SiH polymer does not form a network film by a sol-gel reaction process by itself because it does not contain alkoxy moieties on its terminal sites. The few ethoxysilane groups present in the internal sites of this HBP at most can cause the polymer to microgel on standing. On the other hand, the trialkoxysilyl-functionalized HB-PCS-Si(OMe)$_3$ material forms a very hard polymer matrix upon curing by a sol-gel process. Hence, this polymer is at the other extreme of the network hardness scale and also is not good for the final coating systems. Therefore, only, a correct formulation of these two HBPs is able to provide a network matrix that will satisfy the above listed requirements.

For this reason, optimization of the polymer blend formulation was carried out using the two HBPs, and the results obtained are summarized in Table 2.

TABLE 2

Optimization of the polymer blend composition for appropriate network matrix

| Slide No. | HB-PCS (µL) | HB-PCS-Si(OMe)$_3$ (µL) | Blend ratio (vol %) | Catalyst (dibutyltin dilaurate) | Relevant film properties |
|---|---|---|---|---|---|
| A | 175 | 25 | 87.5/12.5 | trace | Delayed film formation |
| B | 150 | 50 | 75/25 | trace | Film formed, elastomeric, transparent |
| C | 140 | 60 | 70/30 | trace | Film formed, elastomeric, transparent |
| D | 130 | 70 | 65/35 | trace | Film formed, slightly cracked |
| E | 120 | 80 | 60/40 | trace | Film formed, slightly cracked |
| F | 110 | 90 | 55/45 | trace | Film formed, slightly cracked |
| G | 100 | 100 | 50/50 | trace | Film formed, slightly cracked |
| H | 50 | 150 | 25/75 | trace | Film rolled off of glass |
| I | 25 | 175 | 12.5/87.5 | trace | Film rolled off of glass |

It can be seen from this table that the best coatings were obtained from the blends with volume ratios ranging between 85/15 to 70/30.

Example 14

Fabrication of OPL Films

OPL films were prepared from a mixture of HB-PCS modified with a functionalized dye from Example 11, HB-PCS with a 95/5 ratio of Me/OEt from Example 3, HB-PCS with a 95/5 ratio of Me/OEt from Example 3 wherein additional OPL components were dispersed, and trimethoxysilyl-functionalized HB-PCS with 95/5 ratio of Me/OEt prepared in a manner analogous to that described in Example 2 wherein the overall volume ratio of HB-PCS to HB-PCS-Si(OMe)$_3$ in the mixture was 80/20 as described in Example 13. Dibutyltin dilaurate was used as a catalyst. The samples were cured at RT overnight.

In order to develop optically clear and haze-free films and coatings, two approaches were evaluated. One was to prepare thin films, while the other was to develop sandwich configurations where the polymer loaded with dyes was sandwiched between two glass substrates.

Thin OPL films: These films were prepared with enhanced dye loading levels in order to achieve transmission equivalent to that of thicker counterparts (i.e., 50 to 70% T).

Sandwich film configuration: Sandwich films were prepared and evaluated as the other type of film configuration to exploit the cooperative OPL effect of the OPL-active components. For these films, polymer-OPL mixtures were first prepared as thin films and cured between two glass substrates.

Since the HBP networks (HB-PCS and/or HB-PU SOX) function as the matrix for the components responsible for OPL, they must be conducive to the various laser limiting and blocking mechanisms.

OPL (laser blocking) mechanisms in the proposed system may include light scattering by transient bubble formation in the CNT's localized environment. Two requirements for such a mechanism to work include fast and efficient energy transfer from the CNT to the polymer network matrix and the ability of the polymer matrix to soften enough to form microbubbles by the energy gained from laser impingement.

The base filter is a polymer matrix (preferably, HB-PCS or polycarbonate) doped with OPL-active components. At the upper side of this film, there are two more thin films. The first film is made of HB-PCS containing self-focusing components (such as Ag or Au nanoparticles). Over this film is a CNT doped HB-PUSOX top coat. At the other side of the base filter is a thin polymer (preferably, HB-PUSOX) film containing azo dye.

Thus, a ~200 µm thick coating can be obtained which is tough and scratch-resistant yet flexible enough to exhibit OPL performance at lower input threshold energy and with a faster response time.

Example 15

Evaluation of Films

To characterize and evaluate the dye-doped polymer films, the following evaluations were carried out: linear optical absorption/optical transparency measurements, thickness measurements, and evaluation of optical properties.

Part A: Evaluation of Optical Transparency of the Films

The transmission spectrum was recorded over the broad visible range (300 to 900 nm) for a ~200 µm thick film using a UV-visible spectrometer. An ordinary glass slide was used for the scan. Both the control glass slide and the HB-polymer control slide had an identical transmission profile of approx. 90% throughout the 400 to 900 nm region, clearly demonstrating that the base polymer had ideal transparency to normal light. It was also possible to obtain the desired transmittance from the loaded HBP polymer blends by adjusting the concentrations of the components (sMWNTs, RSA dyes, etc.).

Part B: Evaluation of optical power limiting (OPL) properties of films coated on glass Representative samples (films coated on glass slides) were evaluated for their OPL and laser blocking properties.

Following the present invention, it is possible to obtain a coating material that will be easy to apply on planar as well as on curved surfaces owing to the HBP's unique ability to be coated onto glass, polycarbonate, and many other surfaces either by spin coating, spray coating, brush coating, or float coating with RT curing. A tough and scratch-free coating is possible that is suitable for eyewear applications.

Example 16

OPL Measurements on Polymer Films

Part A: Visible-NIR Laser Blocking

Each of the dye doped HBP-sMWNT films were subjected to laser light pulses in the wavelength range 400 nm to 1400 nm. The standard laser for the OPL measurements is a Q-switched Nd:YAG laser producing single shot nanosecond pulses at 532 nm and 1064 nm. The 1064 nm light pulse is frequency doubled for measurements at 532 nm Two broadband Si energy detectors with picojoule resolution were used along with neutral density filters for simultaneous measurement of the input and output pulse energy. A beam profiler was used to determine the area of the light pulse at the target allowing the input and output pulse energy to be converted to fluence.

A tunable pulsed dye laser (pumped by the Nd:YAG laser operating at 532 nm) in the same setup was used to evaluate the polymer films for broadband OPL response from 548 nm to 867 nm.

The response time of various components in the functionalized polymer films was different and the laser blocking response is complex. Ultra high speed photodiodes and an ultra high speed digital oscilloscope were used in a "one shot" mode to determine and evaluate the time-resolved laser blocking response.

Part B: Continuous Fluence Measurements

Two silicon energy probes were used to simultaneously monitor incident and exit pulse energy. The data was directly recorded on a computer for later analysis. A powered rotation stage, controlled by the computer, enabled changing the energy of the incident light pulse.

Part C: Continuous Fluence Measurements at Selected Wavelengths

At least 4 laser lines in the visible and NIR wavelength regions (400 to 2000 nm) were used for evaluation of OPL properties of the films. The second harmonic generator (SHG) produced two output pulses, the signal and idler. The wavelength of the signal was tunable in the range from 400 to 700 nm; the idler was in the range from 800 to 2000 nm. While the maximum pulse energies that can be achieved depended on the wavelength, typical values are in the range of several mJ. The energy of the incident pulses were varied in this range while the transmitted pulse energy was measured.

Part D: Z-Scan Measurements of OPL

The open aperture Z-scan method was employed to determine the nonlinear optical absorption of the samples. In the Z-scan method, the laser beam was focused and the film was moved through this focus by a computer controlled translation stage. As the film moves, the cross section of the beam at the sample plane changes, which in turn changes the fluence. The plot of the transmission vs. sample position was converted to transmission vs. fluence. A Z-scan setup with a 30 cm focal length lens and 10 cm translation stage was used.

Part E: Light Scattering Measurements

An ideal OPL filter should exhibit minimum light scattering. Therefore, scattering of the laser light pulse incident to the polymer film was carried out. The energy transmitted through a given solid angle was measured by placing an energy detector behind a pinhole located at the focal plane of the collecting lens.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

What is claimed is:

1. A polymer coating composition comprising a dye containing polymer coating composition consisting essentially of:
   1) one or more Modified Polymers comprising a Polymer that is a hyperbranched polycarbosiloxane polymer with one or more of: a) reverse saturable dye (RSA), b) multiphoton absorption dye (MPA), c) an azo dye, or d) absorption dye, which dye is covalently bonded to the pendant groups of the Polymer (along its chain and/or termini) or which forms a part of the backbone of the Polymer; and
   2) carbon nanotubes (CNT) as optical power limiters (OPL); and
   3) a self focusing component.

2. The composition of claim 1 wherein the dye is a part of the backbone of the Modified Polymer.

3. The composition of claim 1 wherein at least two Polymers are present.

4. The composition of claim 1 wherein the dye in the Modified Polymer is a fullerene based donor-acceptor complex (RSA), stilbene-3 (MPA), disperse red 1 acrylate (DR1), phthalocyanine (Pc), or 2,5-dimethyl-(4-p-nitrophenylazo)anisole (DMNPAA).

5. The composition of claim 1 wherein the self-focusing component is metal nanoparticles or metal oxide nanoparticles.

6. The composition of claim 5 wherein the metal nanoparticles are gold or silver nanoparticles.

7. The composition of claim 1 wherein at least two dyes are present.

8. The composition of claim 1 wherein the carbon nanotubes (CNT) are a single wall carbon nanotube (SWNT), a short single wall carbon nanotube (sSWNT), double wall carbon nanotube (DWNT), multiwall carbon nanotube (MWNT), or short multiwall carbon nanotube (sMWNT).

9. The composition of claim 8 wherein the short multiwall carbon nanotube is from about $0.1\mu$ to about $5\mu$ in length and from about 1 nm to about 30 nm in diameter.

10. The composition of claim 1 wherein the composition is a single-layer filter.

11. The composition of claim 1 wherein the composition is coated on a base filter.

12. The composition of claim 11 wherein the coating is a solid or a liquid.

13. The composition of claim 1 which is used as a) a film, b) a coating, c) a solution or d) a sandwiched film between two transparent substrates.

14. The composition of claim 13 wherein the sandwiched films are between glass and/or plastic and/or composites.

15. The composition of claim 1 which is used as a material in laser blocking.

16. The composition of claim 15 wherein the laser blocking is for protection: of eyes and sensors from damage due to intense light (such as laser radiation), of eyewear equipment for soldiers' eyes, civilian law enforcement, of health care professionals or patients, of optical receivers and transmitters on laser based satellite communication systems, or of commercial communication satellites.

17. A Modified Polymer composition consisting essentially of a Polymer that is a hyperbranched polycarbosiloxane polymer with one or more of: a) reverse saturable dye (RSA), b) multi-photon absorption dye (MPA), c) an azo dye, or d) absorption dye, which dye forms a part of the backbone of the Polymer.

18. The composition of claim 17 wherein the dye is a phthalocyanine or anthracene based material.

19. A Modified Polymer composition consisting essentially of a Polymer that is a hyperbranched polycarbosiloxane polymer with one or more of: a) reverse saturable dye (RSA), b) multi-photon absorption dye (MPA), c) an azo dye, or d) absorption dye, which dye is covalently bonded to the pendant groups of the Polymer (along its chain and/or termini).

20. The composition of claim 19 wherein the dye is a phthalocyanine or anthracene based material.

* * * * *